United States Patent
Iguchi

(10) Patent No.: US 7,663,627 B2
(45) Date of Patent: Feb. 16, 2010

(54) GRAPHIC DRAWING PROGRAM, METHOD, AND APPARATUS

(75) Inventor: Masayuki Iguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 384 days.

(21) Appl. No.: 11/526,685

(22) Filed: Sep. 26, 2006

(65) Prior Publication Data

US 2007/0211058 A1 Sep. 13, 2007

(30) Foreign Application Priority Data

Mar. 7, 2006 (JP) ............... 2006-060664

(51) Int. Cl.
*G06T 11/20* (2006.01)
*G09G 5/00* (2006.01)
(52) U.S. Cl. ....................... 345/440; 345/635
(58) Field of Classification Search ...... 345/440–469.1, 345/635–636
See application file for complete search history.

(56) References Cited

U.S. PATENT DOCUMENTS

| 5,689,717 | A | * | 11/1997 | Pritt | ............................ | 715/234 |
| 5,909,192 | A | * | 6/1999 | Finch et al. | .................. | 342/182 |
| 7,131,060 | B1 | * | 10/2006 | Azuma | ........................ | 715/260 |
| 7,369,127 | B1 | * | 5/2008 | Hull | ............................ | 345/440 |

FOREIGN PATENT DOCUMENTS

JP 08-030593 2/1996

* cited by examiner

*Primary Examiner*—Kee M Tung
*Assistant Examiner*—Robert Craddock
(74) *Attorney, Agent, or Firm*—Staas & Halsey LLP

(57) ABSTRACT

A graphic drawing apparatus for drawing a graphic representation in which a plurality of evaluation objects are drawn by lines connecting scores with respect to a plurality of evaluation items executes a drawing-position adjusting to adjust drawing positions for each of the evaluation items where the scores of the evaluation objects are plotted with respect to each of the evaluation items so that the drawing positions do not overlap each other according to the scores of the evaluation objects with respect to an evaluation item.

9 Claims, 10 Drawing Sheets

The visualization target table 141 evaluation objects 141n 1412

| evaluation items | | object1 | object2 | object3 | ... |
|---|---|---|---|---|---|
| | item1 | 1 | 3 | 1 | ... |
| | item2 | 3 | 3 | 1 | ... |
| | item3 | 4 | 3 | 3 | ... |

The past score list 142, 1421

| possible different number of score types | 1 | 2 | 3 | ... |
|---|---|---|---|---|
| Score | 1 | 3 | – | ... |

1422

Fig. 2B same-score object extraction table ~ 143

| detected order | 1 | 2 | 3 | ... |
|---|---|---|---|---|
| Score | 1 | 1 | | ... |
| object name | object1 | object3 | | ... |

Fig. 2C next-evaluation-item score-order table ~ 144

| score order | 1 | 2 | 3 | ... |
|---|---|---|---|---|
| object name | object3 | object1 | | ... |

Fig. 2D a visualization result table 145 evaluation objects 145n evaluation items 145N

| | object1 | object2 | object3 | ... |
|---|---|---|---|---|
| item1 | 1.2 | 3 | 1 | ... |
| item2 | 3.1 | 2.9 | 1 | ... |
| item3 | 4 | 3.2 | 3 | ... |

1453  1451  score 141Sn 1452  1454

Fig. 2E

—Prior Art—

GRAPHIC DRAWING PROGRAM, METHOD, AND APPARATUS

BACKGROUND OF THE INVENTION

1. Field of the Invention

The present invention relates to graphic drawing programs, methods, and apparatuses. More specifically, the present invention relates to a graphic drawing program, method, and apparatus for displaying a graphic representation in which a plurality of evaluation objects are drawn at coordinates and lines connecting the evaluation objects.

2. Description of the Related Art

An image forming technique in which each of a plurality of points is set as a forming or non-forming portion of an image on the basis of the coordinates on the image forming plane so that the forming portions and the non-forming portions are not superposed, even if a large number of broken lines plotted overlap, in order to prevent a linear image from being produced by overlapping a large number of broken lines plotted is disclosed in, for example, Japanese Unexamined Patent Application Publication No. 8-30593.

However, in a graphic representation in which a plurality of evaluation objects are drawn by lines connecting scores with respect to a plurality of evaluation items, such as a graph or a chart, as illustrated in FIG. 7, the plurality of evaluation objects may have the same score (or scores that are sufficiently close to be plotted within the line thickness of other evaluation objects in the graphic representation) with respect to a given evaluation item, and may be drawn by overlapping lines. In this case, the evaluation objects other than the evaluation object drawn close to each other may not be easily identified by an observer.

SUMMARY OF THE INVENTION

According to the present invention, there is provided a method of drawing a graph. The graph is drawn for a plurality of objects. Each object has a plurality of plot characters. The plot characters have coordinates. The method comprises, comparing a difference between the coordinates for each of the plot characters of the objects when the characters are close to each other, changing the coordinates to a second coordinates which is changed by a predetermined calculation, and plotting the plot character according to the second coordinates.

BRIEF DESCRIPTION OF THE DRAWINGS

FIGS. 2A to 2E are diagrams showing examples of data layouts;

DESCRIPTION OF THE PREFERRED EMBODIMENTS

The embodiments of the present invention have been made in view of the above-described problem of the related art and to provide other new effects as described herein by providing a graphic drawing program, method, and apparatus in which the visibility of all evaluation objects can be improved even if evaluation scores are plotted so as to be close to each other, or adjacent, including overlapping, or as a set parameter, or too close to be readily observable in a drawing on which a plurality of evaluation objects with respect to a plurality of evaluation items are to be individually identified, such as a graph or a chart.

Figure 4:
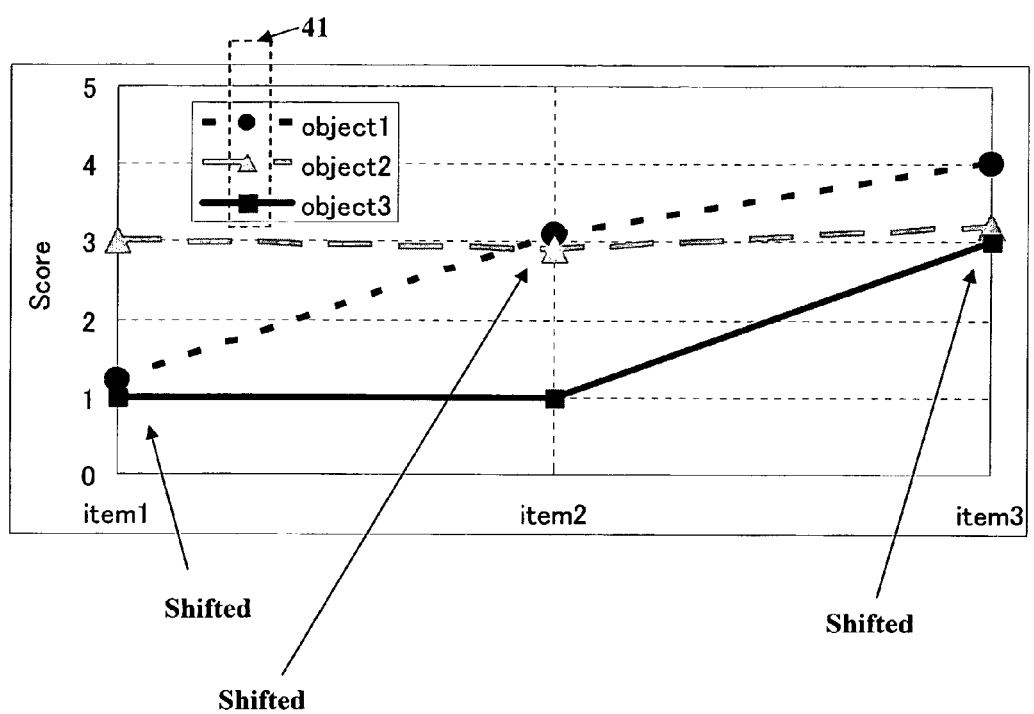
FIG. 4 is a diagram showing an example of a graphic representation according to an embodiment of the present invention.

According to an aspect of the embodiments of the present invention, there is provided a graphic drawing program for drawing a graphic representation of a relation for a plurality of evaluation objects in a coordinate systems for example, a line graph in which a plurality of evaluation objects are drawn by lines connecting scores with respect to a plurality of evaluation items a shown in FIG. 4. The graphic drawing program causes a computer to execute a drawing-position adjusting by adjusting drawing positions for each of the evaluation items where the scores of the evaluation objects are plotted with respect to each of the evaluation items, so that the drawing positions do not overlap each other according to the scores of the evaluation objects with respect to adjacent or overlapping evaluation items.

Accordingly, the position adjusting is executed by the computer, whereby the visibility of all evaluation objects can be improved in a drawing on which a plurality of evaluation objects are to be individually identified, such as a graph or a chart, even if the plotted lines overlap.

Figure 1:
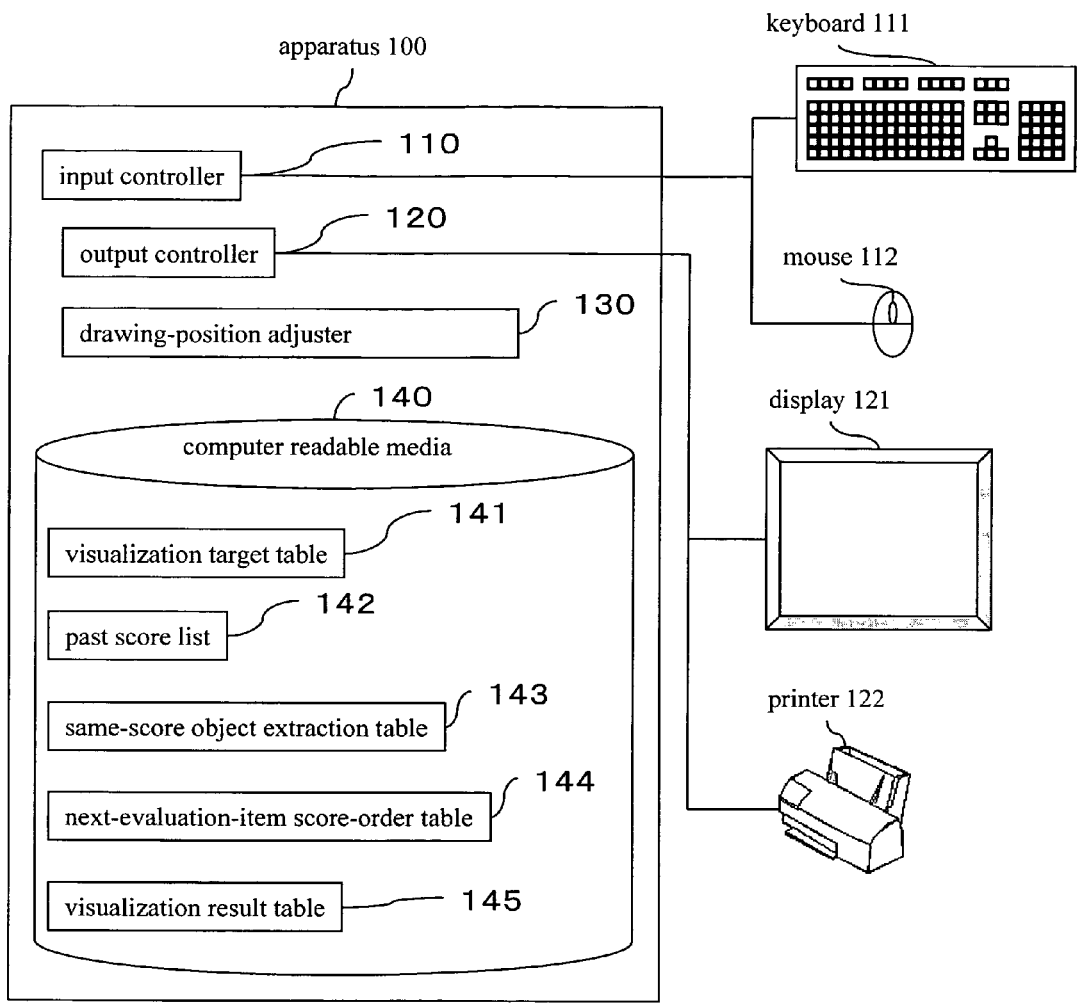
FIG. 1 is a diagram of a graphic drawing apparatus according to an embodiment of the present invention.

FIG. 1 is a schematic configuration diagram of a graphic drawing apparatus according to an embodiment of the present invention.

For example, the graph is two-dimensional coordinates.

A graphic drawing apparatus 100 according to an embodiment of the present invention is an information processing apparatus (computer), such as a personal computer, including input controller 110 for controlling information input from a user through an input device such as a keyboard 111 or a mouse 112, output controller 120 for controlling information output to an output device such as a display 121 or a printer 122, drawing-position adjuster 130 performing a drawing-position adjusting process according to the embodiments of the present invention, and computer readable medium 140 to store data for storing various data. The computer readable medium is, for example, a register in the RAM, hard disk drive. According to an aspect of the embodiments, the drawing position adjuster 130 is implemented in software and/or computing hardware.

A flow of the process performed by the drawing-position adjuster 130 of the graphic drawing apparatus 100 according to an embodiment the present invention will be described in detail with reference to FIGS. 2A to 3B. FIGS. 2A to 2E illustrate data layouts of the data stored in the computer readable medium 140 of the graphic drawing apparatus 100.

A visualization target table 141 stores an original data. The original data is input data from the inputting controller 110.

A visualization result table 145 stores adjusted plotting data. The plotting data is used for adjusted plotting of the original data referred to as "plotting data".

A past score list 142, a same-score object extraction table 143 and a next-evaluation-item score-order table 144 are intermediate tables for converting from the original data to the plotting data. The past score list 142, the same-score object extraction table 143 and the next-evaluation-item score-order table 144 have functions as referred to hereinafter.

Figure 3A:
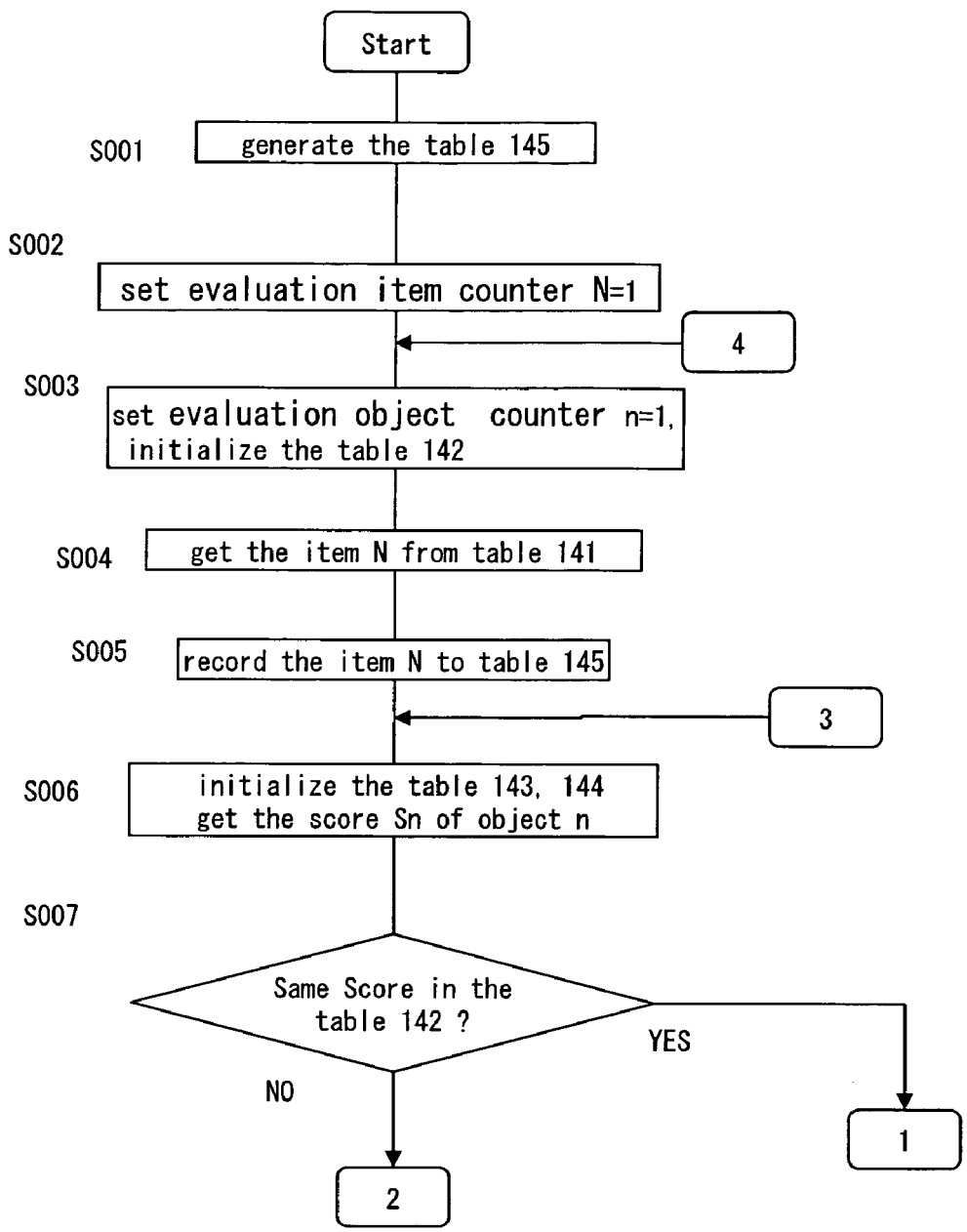
FIG. 3A is a flowchart showing a drawing-position adjusting process according to an embodiment of the present invention.
Figure 3B:
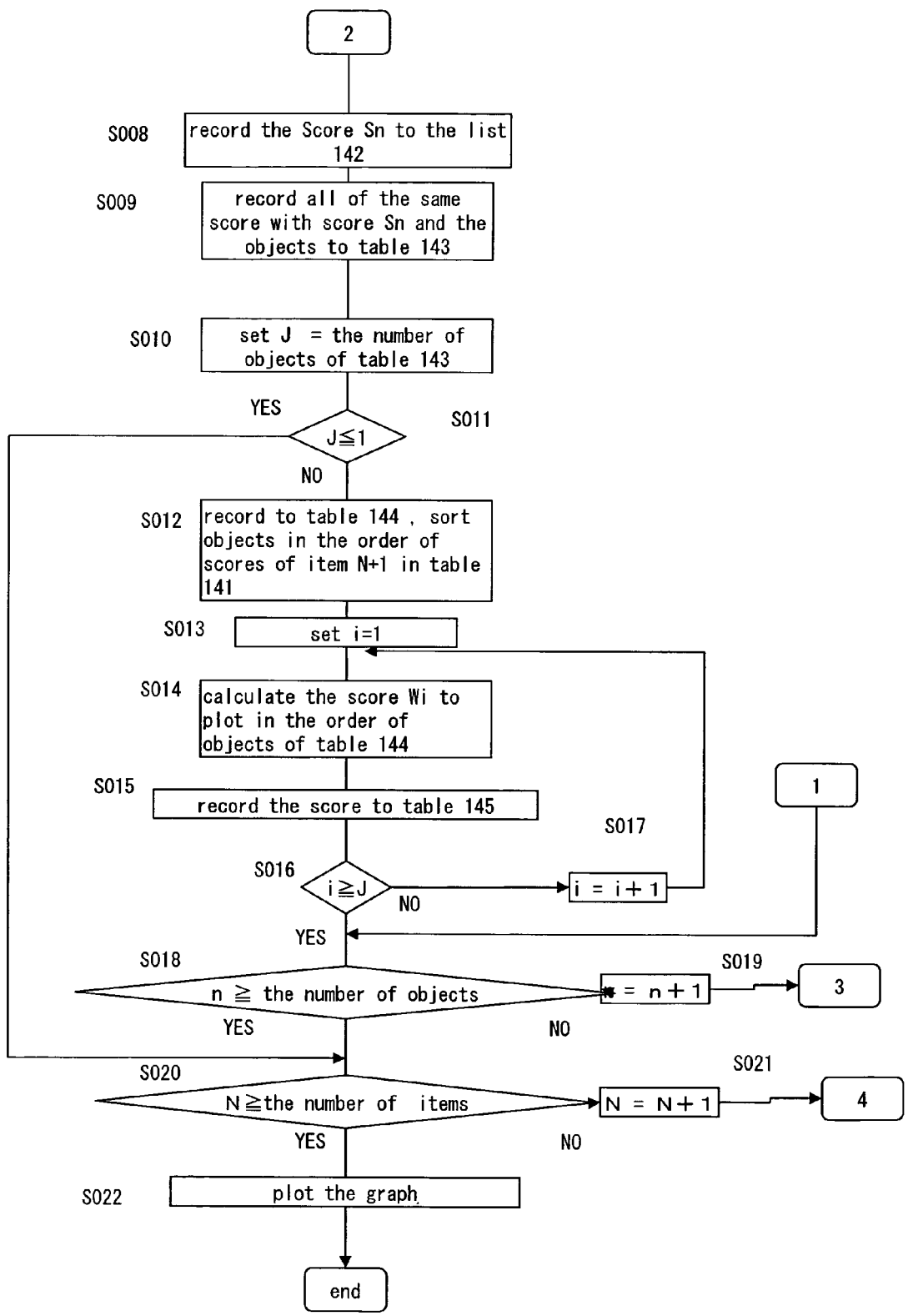
FIG. 3B is a flowchart showing a drawing-position adjusting process according to an embodiment of the present invention.

FIG. 3A and FIG. 3B are flowcharts showing the drawing-position adjusting process from the original data in the visualization target table 141 to the plotting data in the visualization result table 145.

The drawing-position adjuster 130 of the graphic drawing apparatus 100 according to an embodiments of the present invention execute following processes. The executing command is input by the input controller 110. In step S001 of FIG. 3A, the drawing-position adjuster 130 generates a data area for the visualization result table 145. The drawing-position adjuster 130 refers to the visualization target table 141 shown in FIG. 2A.

The visualization result table 145 shown in FIG. 2E is generatable according to a graphic drawing instruction input via the input controller 110 by a user's operation of the graphic keyboard 111 and the mouse 112, and stored in the computer readable medium 140. The visualization target table 141 includes evaluation item target records 141r. Each of the evaluation target records 141r includes scores 141Sn of a plurality of evaluation objects 141n with respect to each of a plurality of evaluation items 141N. The visualization result table 145 includes the evaluation items 141N and the evaluation objects 141n, which are the same as those included in the visualization target table 141. Each of the evaluation items 141N means an element for the evaluation object 141n. Each of the score 141Sn are determined by the evaluation item 141N and the evaluation object 141n.

In step S002, the drawing-position adjuster 130 sets 1 in the evaluation-item counter N.

In step S003, the drawing-position adjuster 130 sets 1 in the evaluation object counter n. And in S003 the drawing-position adjuster 130 initializes and stores the past score list 142 shown in FIG. 2B in the computer readable medium 140. Each time a different score 141Sn with respect to each of the evaluation item target records 141r is found, the drawing-position adjuster 130 stores the score 141Sn to a score 1422 in the past score list 142 because the drawing position adjuster 130 detects a type of scores in the evaluation target records 141r and a number of the same score in the evaluation target records 141r. A score 141Sn not detected in an evaluation target record 141r means the score 1422 is nonexistence in the past score list 142.

Figure 7:
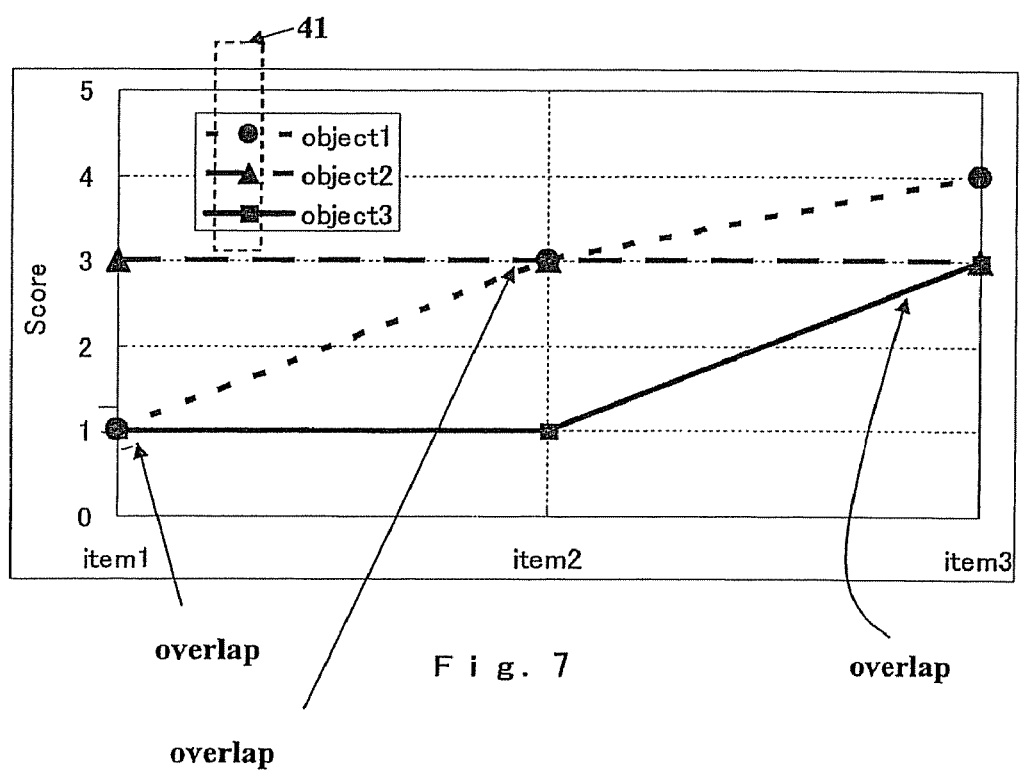
FIG. 7 is a diagram showing an example of a graphic representation of the related art.

For example, the past score list in FIG. 2B, which is for the FIG. 7 graph represented in the visualization target table 141 and is generated at S003 for each evaluation target record 141r in FIG. 2A, stores for the first evaluation target record 141r in FIG. 2A two types of scores among object 1, object 2, and object 3, namely scores of 1 and 3 detected among object 1, object 2 and object 3. In other words, in FIG. 7 there are no scores of 0, 2, and 5 in the first evaluation target record 141r.

A possible number of different score types 1421 can be a maximum number of different score types for the number of evaluation objects 141 in an evaluation target record 141r. For example, for the FIG. 7 graph, there are three evaluation objects 141, so the maximum number of different score types for each evaluation target record 141r would be 3 different score types. In the past score list 142, there are only two different types of scores, suggesting that there are same scores for the evaluation objects 141 in the evaluation target record 141r.

Therefore, the number of the same scores in the evaluation target records 141r can be determined from the type of scores 1422 being less than the possible different types 1421 for the number of evaluation objects 141. The type of scores in the evaluation target records 141r is a score 1422. The score 1422 means the score of each type of scores 141Sn of the evaluation target records 141r. The drawing-position adjuster 130 stores the score 141Sn to the score 1422, when the drawing-position adjuster 130 detects a new type of the score 141Sn of the evaluation target records 141r.

In step S004, the drawing-position adjuster 130 obtains the evaluation target record 141r associated with the evaluation-item counter N from the visualization target table 141.

In step S005, the drawing-position adjuster 130 outputs the evaluation target record 141r obtained in step S004, which stores the scores 141Sn of the plurality of evaluation objects 141n with respect to the evaluation item corresponding to the evaluation-item counter N (hereinafter referred to as an "evaluation item N"), in the visualization result table 145, and thus additionally stores the obtained evaluation target record 141r in the table 145 to initialize the table 145.

In step S006, the drawing-position adjuster 130 initializes the same-score object extraction table 143, based upon the evaluation target records 141r read and output in S004, as shown in FIG. 2C in the computer readable medium 140.

The same-score object extraction table 143 stores evaluation objects 141x and the scores 141Sx. The same-score object extraction table 143 stores evaluation objects 141x in the order of detecting evaluation objects 141 and stores the evaluation objects 141x that have the same score in the evaluation target record 141r. The scores 141Sx is the score of the evaluation objects 141x. A detected order 1431 can represent a number of the evaluation objects 141x detected, which in this case is 3 evaluation objects 141. A maximum value of the detected order 1431 is a maximum value of counter "n". The drawing-position adjuster 130 can use the counter "n" when the drawing-position adjuster 130 determines an order of evaluation objects 141x of the next-evaluation-item score-order table 144 shown in FIG. 2D.

In S006, the drawing-position adjuster 130 also initializes the next-evaluation-item score-order table 144. The next-evaluation-item score-order table 144 stores the order of rearranging the evaluation objects 141x in the same-score object extraction table 143. For example, the rearranging is based on the scores 141Sn of the evaluation objects 141n with respect to an evaluation item N+1 next to the evaluation item N. Thereafter, the drawing-position adjuster 130 obtains the scores 141Sn of the evaluation objects 141n. A score order 1441 is a number of an order of the rearranging.

For example, in FIG. 2D, the evaluation object 1 and object 3, which have same score of 1 as provided in the evaluation item target record 141r, have been rearranged with respect to the same-score object extraction table 143 and the visualization target table 141, in the next-evaluation-item score-order table 144. The present invention is not limited to the described example same-score evaluation object rearranging embodiment, and other rearranging embodiments can be provided, for example (without limitation) based upon one or more evaluation item(s) N+k or N−k (k can be any number) or any combinations thereof. Further, such rearrangement can also be based upon graph display conditions, for example, crossed and/or overlapped lines, plot characters (a graphic representation output, for example, on a display screen 902a of a computer display 902—FIG. 7 square, triangle, circle, line, etc.), etc., or any combinations of rearrangements. According to an aspect of the embodiments, the rearrangement step can be optional.

According to an aspect of the embodiments, FIG. 3A and 3B steps are repeatedly performed as a program loop for each evaluation-item N and evaluation object n to generate the intermediate tables 142, 143, and 144 and to generated the visualization result table 145 as an adjusted plot data based upon the intermediate tables 142, 143 and 144.

In step S007, the drawing-position adjuster 130 determines whether the past score list 142 has stored therein the same values as the scores Sn obtained in step S006. If the same values have been stored (YES in step S007), the process proceeds to step S018. If not (NO in step S007), the process proceeds to step S008.

In step S008, the drawing-position adjuster 130 outputs the scores Sn obtained in step S006 to the past score list 142, and thus additionally stores the obtained scores Sn in the past score list 142.

In FIG. 3B step S009, the drawing-position adjuster 130 outputs all evaluation objects 141x in the evaluation target record 141r obtained in step S004 and having the same scores as the scores Sn obtained in step S006 (or scores that are sufficiently close to be plotted within the line thickness in the graphic representation) and outputs the scores Sx of the evaluation objects 141x, to the same-score object extraction table 143 in the order detected. The output results are therefore additionally stored in the same-score object extraction table 143.

In step S010, the drawing-position adjuster 130 sets a same-score object counter J to the number of evaluation objects 141x stored in the same-score object extraction table 143 in step S009.

In step S011, the drawing-position adjuster 130 determines whether the same-score object counter J is 1 or less, which does not require the rearrangement of the evaluation objects 141x in step S012. If the same-score object counter J is a value that does not require the rearrangement (YES in step S011), the process proceeds to step S020. If the same-score object counter J is a value that requires the rearrangement (NO in step S011), the process proceeds to step S012.

In step S012, for all of the evaluation objects 141x stored in the same-score object extraction table 143 in step S009, the drawing-position adjuster 130 refers, for example, to the next evaluation item, i.e., the evaluation target record 141r associated with the evaluation-item counter N+1 (or the evaluation-item counter 1 if the value given by N+1 exceeds the number of evaluation items), to obtain the scores Sx, and rearranges the obtained scores Sx based thereon. The results are output to the next-evaluation-item score-order table 144, and are thus additionally stored in the next-evaluation-item score-order table 144.

In step S013, the drawing-position adjuster 130 sets 1 in the order counter "i" corresponding to the order stored in the next-evaluation-item score-order table 144.

In step S014, the drawing-position adjuster 130 executes a process as described below. The process is executed for each of the evaluation object scores in the score order 1441. The drawing-position adjuster 130 calculates a first value by multiplying a number of the score order 1441 by a predetermined value. The drawing-position adjuster 130 calculates a plotting value. The plotting value is the sum of the first value and the score 141Sx.

In step S015, the drawing-position adjuster 130 outputs the values of plotting to the score column associated with the corresponding evaluation item N and evaluation objects 141x of the visualization result table 145 in FIG. 2E.

According to the step S014 and S015, the drawing-position adjuster 130 can avoid unnecessary crossing-lines. The lines of connecting the item 1 of the table 141 of FIG. 2A and the item 2 of the table 141 of FIG. 2A are described below. The score 1411 is "1". The score 1412 is "1". The score 1413 is "3". The score 1414 is "1". Correspondingly, based upon FIG. 2E table 145, the output controller 120 connects the score 1451 and the score 1453 by a line when the output controller 120 plots the scores. The output controller 120 connects the score 1452 and the score 1454 by a line when the output controller 120 plots the scores. If the plotting value corresponding to the score 1453 is bigger than the plotting value corresponding to the score 1451, the line of the score 1451 and the score 1453 intersect with Y line of the score 1452 and the score 1454.

The predetermined value is a value for determining the amount by which the score values are shifted, so that a plurality of overlapping lines could be identified when ooutput. The predetermined value can be determined in advance. For example, the predetermined value is a value based on the gradient of the graph. Alternatively, for example, the predetermined value is a value more than the value of the thickness of a line segment to be plotted. The value of the thickness of the line segment can be obtained in advance. Alternatively, for example, the predetermined value is a size of a plot character 41 of the plotting of FIG. 4.

In step S016, the drawing-position adjuster 130 determines whether the order counter "i" is equal to or greater than the same-score object counter J. If the order counter "i" is not equal to or greater than the same-score object counter J, then, in step S017, the order counter "i" increments by 1, and the process returns to step S014. If the order counter "i" is equal to or greater than the same-score object counter "J", the process proceeds to step S018.

In step S018, the drawing-position adjuster 130 determines whether the evaluation-object counter "n" is equal to or greater than the number of evaluation objects. If the evaluation-object counter "n" is not equal to or greater than the number of evaluation objects, then, in step S019, the evaluation-object counter "n" increments by "1", and the process returns to step S006. If the evaluation-object counter "n" is equal to or greater than the number of evaluation objects, the process proceeds to step S020.

In step S020, the drawing-position adjuster 130 determines whether the evaluation-item counter "N" is equal to or greater than the number of evaluation items. If the evaluation-item counter "N" is not equal to or greater than the number of evaluation items, then, in step S021, the evaluation-item counter "N" increments by "1", and the process returns to step S003. If the evaluation-item counter "N" is equal to or greater than the number of evaluation items, the process proceeds to step S022.

In step S022, the output controller 120 refers to the visualization result table 145 stored in step S015 to read all of the scores 141Sx as data of the graph in accordance with the drawing type, and outputs a graphic representation shown in FIG. 4 to the display 121 or the printer 122.

Therefore, for example, according to, an aspect of the present invention with reference to the data layouts shown in FIGS. 2A to 2E and the flowchart shown in FIG. 3A and 3B, drawing positions where evaluation objects are drawn with respect to a given evaluation item can be adjusted according to the order of scores of the evaluation objects with respect to an evaluation item adjacent to the given evaluation item.

Thus, a graph that prevents lines from overlapping or crossing can be displayed. Advantageously, the visibility of a graphic representation in which a plurality of evaluation objects are drawn by lines connecting scores with respect to a plurality of evaluation items, such as a graph or a chart, can be improved.

Changing a value of the evaluation item can also avoid overlapping each of the characters. In stead of changing the score 141Sx in step "S14", the drawing-position adjuster 130 can change the value of the evaluation item. For example the drawing-position adjuster 130 multiplies an order of each of the value of the evaluation item of the evaluation objects 141x by a predetermined value.

The above-described graphic drawing apparatus 100 and graphic drawing method according to this embodiment can be implemented by executing a predetermined program by a computer system such as a personal computer or a workstation. According to an aspect of the embodiments, the drawing position adjuster 130 can be implemented in software and/or computing hardware.

A computer system that executes a graphic drawing program having a similar function to that of the above-described graphic drawing apparatus 100 (graphic drawing method) according to this embodiment will be described.

Figure 5:
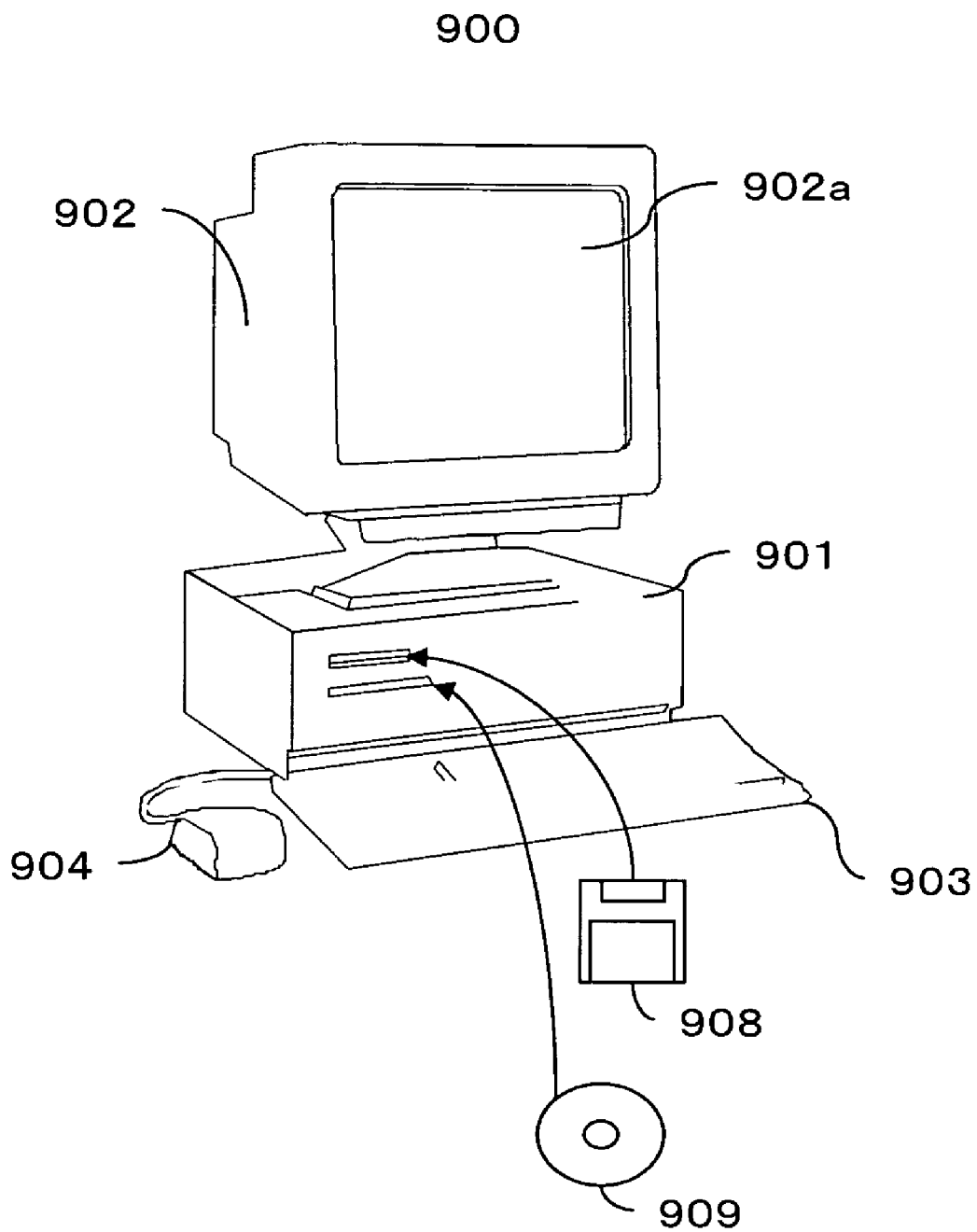
FIG. 5 is a system configuration diagram showing a configuration of a computer system, according to an embodiment of the present invention.
Figure 6:
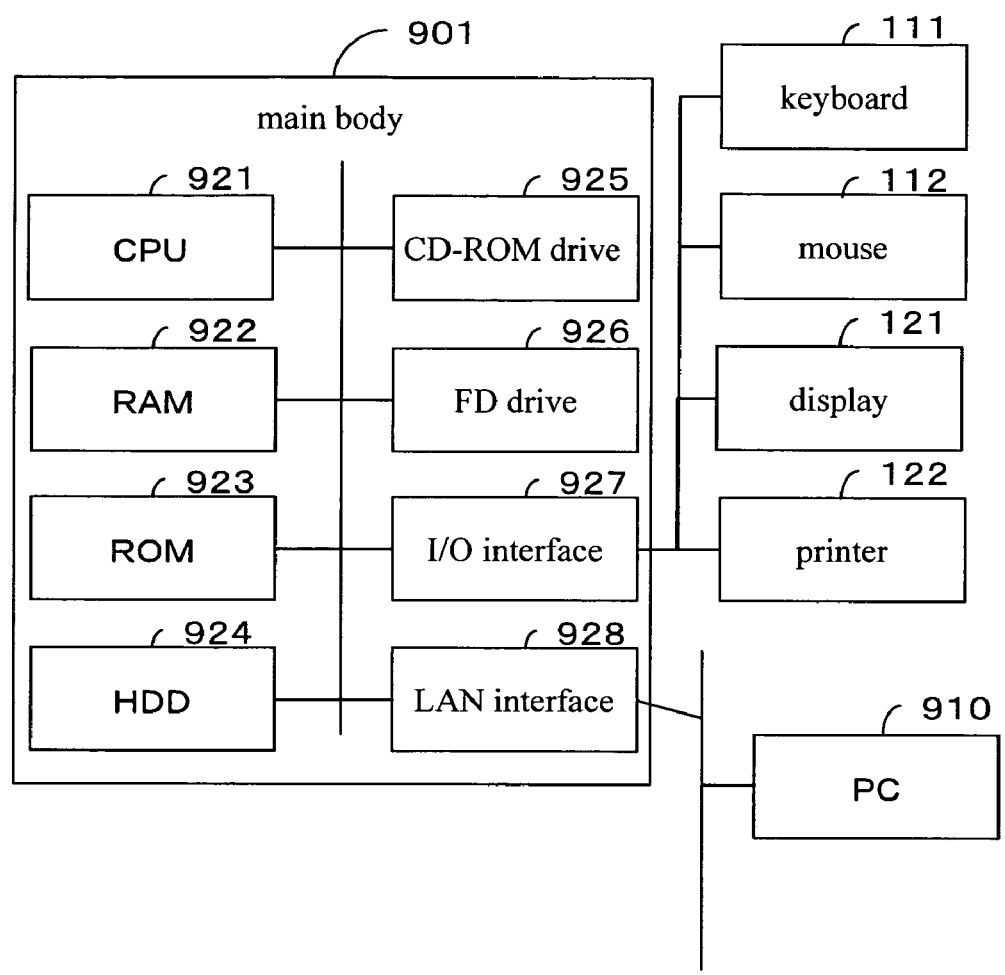
FIG. 6 is a block diagram showing a structure of a main body of the computer system shown in FIG. 5.

FIG. 5 is a system configuration diagram showing a configuration of a computer system according to this embodiment, and FIG. 6 is a block diagram showing a structure of a main body of the computer system shown in FIG. 5.

As shown in FIG. 6, a computer system 900 according to this embodiment includes a main body 901, a display 902 for displaying information, such as an image, on a display screen 902a according to an instruction given from the main body 901, a keyboard 903 for inputting various information to the computer system 900, and a mouse 904 for specifying an arbitrary position on the display screen 902a of the display 902.

As shown in Fig., the main body 901 in the computer system 900 includes a central processing unit (CPU) 921, a random access memory (RAM) 922, a read-only memory (ROM) 923, a hard disk drive (HDD) 924, a CD-ROM drive 925 that receives a CD-ROM 909, an FD drive 926 for receiving a flexible disk (FD) 908, an input/output (I/O) interface 927 that connects between the computer system 900 and a keyboard 111, a mouse 112, a display 121, and a printer 122, and a LAN interface 928 that is connected to a local area network or wide area network (LAN/WAN) 105.

The computer system 900 is also connected to a second computer system (PC) 910 or the like through the LAN interface 928 and the LAN/WAN 105.

The computer system 900 reads and executes a graphic drawing program recorded on a predetermined recording medium, thereby implementing the graphic drawing apparatus 100 (graphic drawing method).

The predetermined recording medium is any recording medium having recorded thereon a graphic drawing program readable on the computer system 900. Examples of the predetermined recording medium include portable physical media, such as the flexible disk (FD) 908, the CD-ROM 909, a magneto-optical (MO) disk, a digital versatile disk (DVD), and an IC card, fixed physical media provided inside or outside the computer system 900, such as the hard disk drive (HDD) 924, the RAM 922, and the ROM 923. Communication media can be used for holding programs for a short period of time when the programs are transmitted, as in a public switched network 907 to which the computer system 900 is connected through a modem 905 and the LAN/WAN 105 to which the second computer system 910 or the like is connected.

That is, the graphic drawing program is recorded on a recording medium, such as the above-described portable physical medium, fixed physical medium, in a computer-readable manner, and the computer system 900 reads and executes the graphic drawing program from such a recording medium, thereby implementing the graphic drawing apparatus 100 and the graphic drawing method.

The graphic drawing program is not limited to that executed by the computer system 900, and an embodiment of the present invention may also be applied to a case in which the second computer system 910 executes the graphic drawing program or a case in which the computer systems 900 and 910 cooperate to execute the graphic drawing program.

While an embodiment of the present invention has been described, the present invention may also be implemented by a variety of different embodiments other than the embodiment discussed above without departing from the technical scope of the invention set forth in the appended claims and their equivalents.

Other information including the processing procedure, control procedure, specific names, various data or parameters described and illustrated in the specification and the drawings may be arbitrarily changed unless stated otherwise.

The components of the apparatuses have been illustrated in the context of the functional concept thereof, and the components are not necessarily physically configured in the illustrated manner. That is, specific discrete or integral forms of the apparatuses are not limited to those illustrated herein, and may be functionally or physically distributed or integrated in part or in its entirety in any unit depending on loads, usage, and so forth.

The processing functions executed by the apparatuses may be implemented in any part or in its entirety by a CPU and a program analyzed and executed by the CPU, or alternatively may be implemented by wired logic hardware.

What is claimed is:

1. A method for controlling an apparatus for drawing a graph, comprising:

reading a plurality of scores from a memory which stores the plurality of scores of a plurality of objects, each of the plurality of scores of the plurality of objects corresponding to one item of a plurality of items and one object of the plurality of objects;

comparing a difference between the scores corresponding to the one item;

changing coordinates of the scores to not overlap in accordance with the scores of the objects of the one item compared and an item that is adjacent to the one item, when the difference between the scores corresponding to the one item is smaller than a predetermined value; and outputting the graph by plotting plot characters which represent the plurality of objects in accordance with the coordinates of the scores corresponding to the plurality of objects to a display or a printer.

2. The method according to claim 1, wherein the changing changes the coordinates of the scores in accordance with sort order of the scores of the objects of the one item compared and the item that is adjacent to the one item.

3. The method according to claim 1, wherein the changing changes the coordinates of the scores to not overlap the plot characters to be plot on the coordinates of the scores that overlap.

4. The method according to claim 1, wherein the changing changes the coordinates of the scores by adding a second predetermined value to the scores.

5. The method according to claim 4, wherein the second predetermined value is according to width of a line connecting the plot characters.

6. The method according to claim 4, wherein the second predetermined value is according to a size of the plot characters.

7. The method according to claim 4, wherein the second predetermined value is according to a gradient of the graph.

8. An apparatus for drawing graph comprising:

a memory for storing a plurality of scores of a plurality of objects, each of the plurality of scores of the plurality of objects corresponding to one item of a plurality of items and one object of the plurality of objects; and a processor for executing a process including:

reading a plurality of scores from the memory, comparing a difference between the scores corresponding to the one item, changing coordinates of the scores to not overlap in accordance with the scores of the objects of the one item compared and an item that is adjacent to the one item, when the difference between the scores corresponding to the one item is smaller than a predetermined value, and outputting the graph by plotting plot characters which represent the plurality of objects in accordance with the coordinates of the scores corresponding to the plurality of objects to a display or a printer.

9. A computer readable recording medium for storing a program for controlling an apparatus for drawing a graph by executing operations comprising:

reading a plurality of scores from a memory which stores the plurality of scores of a plurality of objects, each of the plurality of scores of the plurality of objects corresponding to one item of a plurality of items and one object of the plurality of objects;

comparing a difference between the scores corresponding to the one item;

changing coordinates of the scores to not overlap in accordance with the scores of the objects of the one item compared and an item that is adjacent to the one item, when the difference between the scores corresponding to the one item is smaller than a predetermined value; and outputting the graph by plotting plot characters which represent the plurality of objects in accordance with the second coordinates of the scores corresponding to the plurality of objects to display or a printer.

* * * * *

UNITED STATES PATENT AND TRADEMARK OFFICE
CERTIFICATE OF CORRECTION

PATENT NO. : 7,663,627 B2
APPLICATION NO. : 11/526685
DATED : February 16, 2010
INVENTOR(S) : Masayuki Iguchi It is certified that error appears in the above-identified patent and that said Letters Patent is hereby corrected as shown below:

Column 9, Line 1, change "graph" to --a graph,--.

Signed and Sealed this

Twenty-fifth Day of May, 2010

David J. Kappos
*Director of the United States Patent and Trademark Office*